United States Patent [19]

Corbett et al.

[11] Patent Number: 4,971,862

[45] Date of Patent: Nov. 20, 1990

[54] RESILIENT PAD FOR KEYBOARDS

[75] Inventors: Daniel Corbett, Bridgewater, Mass.; James Walder, Little Compton, R.I.

[73] Assignee: Acushnet Company, New Bedford, Mass.

[21] Appl. No.: 338,477

[22] Filed: Apr. 14, 1989

Related U.S. Application Data

[60] Continuation of Ser. No. 131,114, Dec. 10, 1987, abandoned, which is a division of Ser. No. 881,126, Jul. 2, 1986, Pat. No. 4,737,412.

[51] Int. Cl.$^5$ .................... B32B 9/00; C01L 31/00; H01H 13/70
[52] U.S. Cl. .................... 428/408; 428/517; 428/542.8; 428/521; 428/493; 525/187; 200/5 A
[58] Field of Search ............... 525/187; 428/408, 517, 428/542.8, 493, 494

[56] References Cited

U.S. PATENT DOCUMENTS 4,594,389  6/1986  Lal et al. .................... 525/187
4,737,412  4/1988  Corbett .................... 428/517

FOREIGN PATENT DOCUMENTS 0717116  2/1980  U.S.S.R. .................... 525/187

OTHER PUBLICATIONS

W. Hofmann, Kautschuk-Technologie, Gentner Verlag Stuttgart, 1980, pp. 152 and 180 (no translation).

Primary Examiner—P. C. Sluby
Attorney, Agent, or Firm—Lucas & Just

[57] ABSTRACT

A resilient pad for keyboards, such as computer keyboards, is disclosed. The pad is composed of EPDM blended with a copolymer of propylene oxide and allyl glycidyl ether. Each of the polymers is present in the amount of 10–90 parts. An accelerator system for the polymer blend is also disclosed. The pad has substantially improved resilience as measured by the hysteresis of the pad.

11 Claims, No Drawings

RESILIENT PAD FOR KEYBOARDS

This is a continuation of application Ser. No. 131,114, filed Dec. 10, 1987, now abandoned, which in turn is a division of application Ser. No. 881,126 filed July 2, 1986, now U.S. Pat. No. 4,737,412 dated Apr. 12, 1988.

The present invention relates to keyboards and, in particular, to an improved resilient pad for use in keyboards.

Keyboards are well-known structures. They are typically used in computers, calculators, electronic typewriters, and the like. As is well-known, the resilient pad is used between the keys and the microswitches or other activating devices. When a particular key is depressed, the function of the pad is to give the user good "feel" while, at the same time, having the resilience to return the key to its original position. The pad serves the further function of keeping dust, water, and other contaminants from the operative part of the keyboard.

The state-of-the-art keyboard pads are made from silicone rubber. Silicone rubber has the desirable qualities as hereinbefore set forth. However, it has been found that, especially for some heavy-duty applications, silicone rubber has the disadvantage of not having a long enough flex life. Flex life is the number of cycles that the rubber pad can withstand and still properly perform its function.

Various attempts have been made to find a replacement for the silicone rubber keyboard pad, especially where a high flex life is required. One of the materials that has been tried is EPDM. While EPDM has an excellent flex life, it is generally not considered optimum as a keyboard pad because of low resilience.

The applicant has now discovered that an excellent keyboard pad having all of the desirable properties of a keyboard pad, including excellent resilience and excellent flex life, can be obtained with a blend of EPDM and a copolymer of propylene oxide and allyl glycidyl ether such as that sold under the trademark Parel by Hercules. The addition of Parel copolymer to EPDM substantially improves the resilience of the pad without adversely affecting the flex life of the pad. The ratio of EPDM to Parel copolymer is suitably 10:90 to 90:10. It is preferred that the materials be present in the ratio of 40:60 to 60:40 and best results have been obtained with a substantially 50:50 ratio of the two materials.

The term EPDM as used herein is a common industry term which refers to a terpolymer of an ethylene propylene diene monomer. In the terpolymer, the diene is present in a comparatively small amount. Various dienes are in common commercial use including, for example, 1,4 hexadiene; ethylidene norbornene; and dicyclopentadiene. Of these, we prefer to use the 1,4 hexadiene such as is present in DuPont's EPDM polymer sold under the name Nordel 1470.

As in normal rubber processing, the formulation includes accelerators, typically sulfur compounds. Suitable accelerators include zinc dibutyldithiocarbamate, tetramethylthiuram disulfide, 2-mercaptobenzothiazole, and similar, known accelerators. The formulation can further include antioxidants, e.g. nickel dibutyldithiocarbamate or polymerized 2,2,4-trimethyl-1,2-dihydroquinoline; activators, e.g. a metal oxide such as zinc oxide or magnesium oxide; curing agents, e.g. a higher fatty acid such as stearic acid; sulfur; and carbon black. Listed below are preferred and typical levels for the various ingredients. The total amount of rubber, i.e. the combination of EPDM and Parel copolymer, is 100 parts. The other ingredients are listed in parts by weight per 100 parts of the rubber component.

| Ingredient | Typical Range | Preferred Range |
| --- | --- | --- |
| EPDM | 10–90 | 40–60 |
| Parel copolymer | 10–90 | 40–60 |
| Antioxidant | 1–3 | 1 |
| Curing agent | 0.75–1.5 | 1 |
| Activator | 3–25 | 10–20 |
| Accelerators | 2–5 | 2–3 |
| Sulfur | 0–3 | 1–2 |
| Carbon black | 0–20 | 5–15 |

In addition to the above-listed ingredients, the formulation can include other ingredients, for example, an additional rubber material such as polyisoprene or polybutadiene may be employed. If an additional rubber material is employed, it is preferred that it not be present in an amount greater than 15 parts by weight of the EPDM-Parel copolymer content. Other ingredients commonly used in rubber formulations can also be employed such as cure retarders, processing aids, and the like.

In forming the pad of the present invention, the two rubber materials, i.e. the EPDM and the Parel copolymer, are first mechanically mixed to homogenize them. It has been found to be important to mix for a sufficient period of time at an elevated temperature to obtain substantially complete homogenization of the two materials. It has been found that this can be accomplished by mixing the two materials in a Banbury mixer at 150°–200° F. for two minutes. After the two polymers have been blended together, the other ingredients except for the accelerators and sulfur are added to the Banbury mixer. The other ingredients are preferably added sequentially in order to insure good mixing in accordance with normal rubber processing procedures. The addition of the further materials suitably takes place at a temperature of up to about 300° F. and is suitably over a period of four minutes.

After the completion of the first stage, i.e. the mixing of all of the ingredients except for the accelerators and the sulfur (if present), the material is cooled. It is then mixed again, suitably in a Banbury mixer, for 2–3 minutes at a temperature of up to about 200° F. with the addition of the accelerators and sulfur. The mixed material is then made into a preform, suitably by extrusion. The extruded preform is then made into the appropriate shape for the particular pad application, suitably by transfer, injection, or compression molding. The part is preferably post cured after molding, suitably at about 225° F. for about two hours.

These and other aspects of the present invention are illustrated in the examples which follow:

EXAMPLE 1

In this example the formulation consisted of the following ingredients with each of the ingredients being listed as parts by weight based on the total rubber content:

| Ingredient | PPHR |
| --- | --- |
| EPDM | 50 |
| Parel copolymer | 50 |
| Nickel dibutyldithiocarbamate | 0.5 |
| Polymerized 2,2,4- | 0.5 |

-continued

| Ingredient | PPHR |
| --- | --- |
| trimethyl-1,2-dihydroquinoline | |
| Stearic acid | 1 |
| Zinc oxide | 15 |
| Zinc dibutyldithiocarbamate | 1 |
| Tetramethylthiuram disulfide | 0.25 |
| 2-mercaptobenzothiazole | 1 |
| Spider sulfur | 1.5 |
| Carbon black | 5 |

The EPDM and Parel copolymer were mixed in a Banbury mixer for two minutes and the temperature rose to about 200° F. during the mixing. The antioxidant, stearic acid, zinc oxide, and carbon black were added sequentially and mixing was continued for another four minutes and the temperature rose to about 300° F. The material was subsequently reintroduced to the Banbury mixer and was mixed for two minutes at a temperature below about 200° F. During this mixing the accelerators (zinc dibutyldithiocarbamate, tetramethylthiuram disulfide, and 2-mercaptobenzothiazole) and the sulfur (spider sulfur) were added. After removal from the Banbury mixer, the mixture was extruded into a suitable preform and the preform was then formed into a keyboard pad in a transfer molding operation. The keyboard pad was cured for two minutes at 350°–360° F. The pad was post cured at 225° F. for two hours.

The finished pad had the following physical properties:

| Property | Value |
| --- | --- |
| Specific gravity | 1.07 |
| Hardness, Shore A | 50 |
| Tensile strength | above 400 p.s.i. |
| Elongation | above 350% |
| Elastic modulus at 100% | above 150 |

The pad was measured for change in peak tactile between compression and relaxation to determine the hysteresis of the rubber. The value is expressed as $\Delta$ grams and indicates the resilience of the material. A material with complete resilience has a value of $\Delta 0$ grams. The pad of this example was found to have a value of $\Delta 8$ grams. The pad was also found to have excellent flex life.

EXAMPLE 2

For comparison purposes, a keyboard pad was made in the same way as Example 1 except that, in this case, the rubber component was only EPDM and no Parel copolymer was present. While the flex life of this product was also excellent, it was found that its resilience was $\Delta 19$ grams, i.e. much worse than the resilience of the pad of Example 1.

EXAMPLE 3

Example 1 is repeated using 10 parts EPDM and 90 parts Parel copolymer. Acceptable results are obtained.

EXAMPLE 4

Example 1 is repeated using 90 parts EPDM and 10 parts Parel copolymer. Acceptable results are obtained.

EXAMPLE 5

Example 1 is repeated using 40 parts EPDM and 60 parts Parel copolymer. Results comparable to those of Example 1 are obtained.

EXAMPLE 6

Example 1 is repeated using 60 parts EPDM and 40 parts Parel copolymer. Results comparable to those of Example 1 are obtained.

It will be understood that the claims are intended to cover all changes and modifications of the preferred embodiment of the invention herein chosen for the purpose of illustration which do not constitute departure from the spirit and scope of the invention.

What is claimed is:

1. A resilient pad comprising 10–90 parts EPDM and 90–10 parts a copolymer of propylene oxide and allyl glycidyl ether.

2. The resilient pad of claim 1 wherein the EPDM and the copolymer of propylene oxide and allyl glycidyl ether are present in the ratio of 40:60 to 60:40.

3. The resilient pad of claim 1 further including one or more accelerators.

4. The resilient pad of claim 1 further including sulfur.

5. The resilient pad of claim 1 further including one or more ingredients selected from the group consisting of carbon black, antioxidants, curing agents, and activators.

6. A resilient pad comprising 10–90 parts EPDM and 9–10 parts of a copolymer of propylene oxide and allyl glycidyl ether, said pad having a resilience of about $\Delta 8$ grams.

7. In a resilient pad the improvement comprising forming said resilient pad from a composition comprising 10–90 parts EPDM and 90–10 parts of a copolymer of propylene oxide and allyl glycidyl ether.

8. The resilient pad of claim 7 wherein the EPDM and the copolymer of propylene oxide and allyl glycidyl ether are present in the ratio of 40:60 to 60:40.

9. The resilient pad of claim 7 further including one or more accelerators.

10. The resilient pad of claim 7 further including sulfur.

11. The resilient pad of claim 7 further including one or more ingredients selected from the group consisting of carbon black, antioxidants, curing agents and activators.

* * * * *